UNITED STATES PATENT OFFICE.

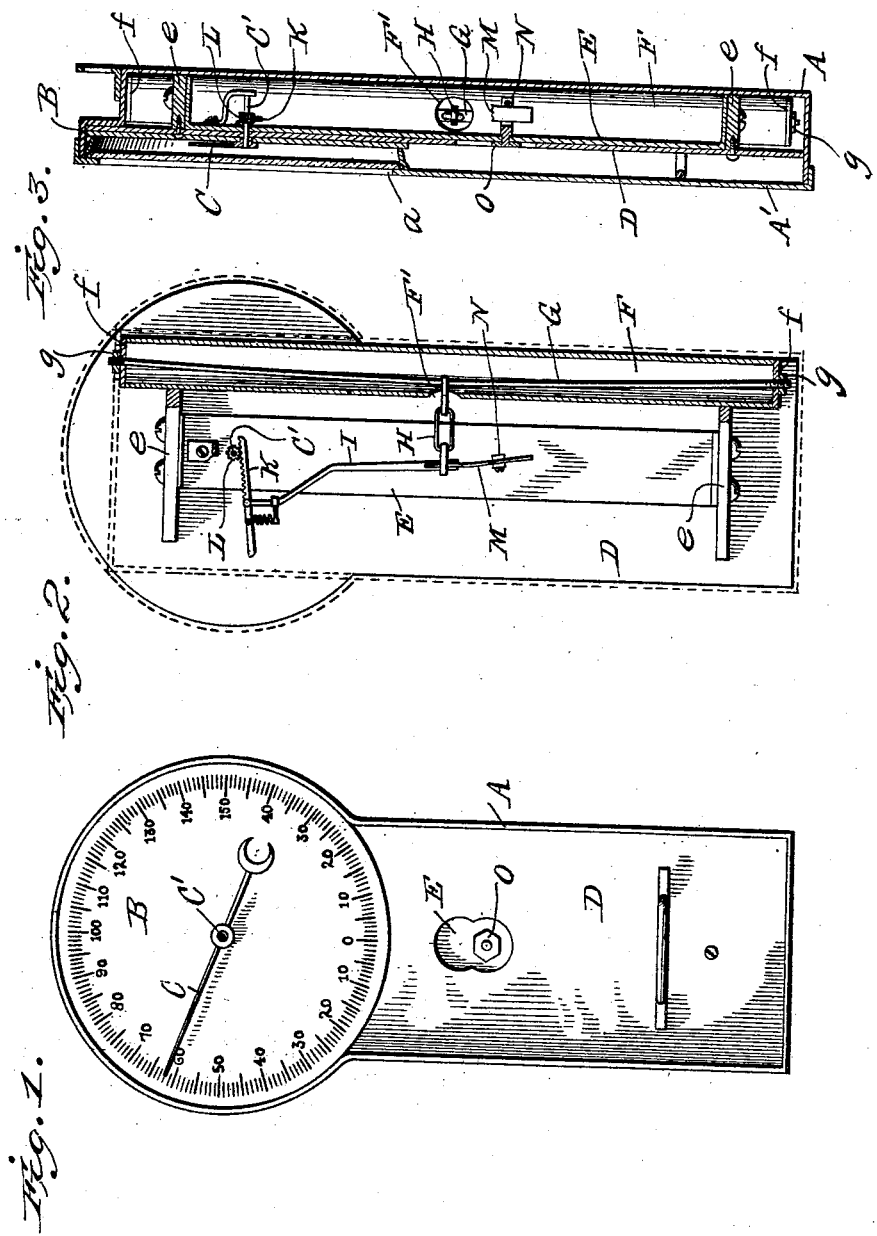

ALBERT N. OZIAS, OF MINNEAPOLIS, MINNESOTA.

TEMPERATURE-INDICATING INSTRUMENT.

No. 904,558.

Specification of Letters Patent.

Patented Nov. 24, 1908.

Application filed April 3, 1908. Serial No. 425,077.

*To all whom it may concern:*

Be it known that I, ALBERT N. OZIAS, of Minneapolis, in the county of Hennepin and State of Minnesota, have invented a certain new and useful Improvement in Temperature-Indicating Instruments; and I do hereby declare the following to be a full, clear, and exact description of the same, reference being had to the accompanying drawings, forming a part of this specification, and to the figures and letters of reference marked thereon.

Instruments for indicating temperature conditions depending for their operation upon the differential expansion of metallic elements are well known in the art, and the present invention relates to that type of this class of instruments wherein the differential expansion is made manifest through variations between the length of an arc and its chord, the arc being understood to mean either a more or less true arc or an angle formed by the center or point of greatest deflection of the arc and the ends of the chord.

The objects of the invention of the present application are to provide a highly sensitive instrument of great accuracy, not liable to become disorganized or inaccurate through rough usage, or through exposure to extreme conditions of either temperature or weather.

Further objects of the invention are to provide an instrument, the parts of which may be manufactured in duplicate by simple processes from relatively cheap stock materials, and when assembled will be capable of convenient and ready adjustment or standardization without necessity for special fitting of the parts of each instrument.

In carrying the invention into practice, the member having the greatest coefficient of expansion is rigid and not subject to deflection, while the member having the least coefficient of expansion forms the arc or is subjected to central deflection in accordance with the variations of temperature, the present instrument differing in this respect from those of the prior art wherein the member or element having the greatest coefficient of expansion has been made flexible or subject to deflection. In the instrument of the present invention errors and lack of stable accuracy are largely avoided.

In the preferred form of instrument, the member having the greatest coefficient of expansion is arranged to exert its pressure in an axial line and conveniently is in the form of a tube with the member forming the arc inclosed within it and having its ends attached rigidly thereto, suitable connections being established between the arc member and the indicating mechanism, as will be hereinafter described.

In the accompanying drawings: Figure 1 is a front elevation with the front casing removed, showing a simple form of metallic thermometer embodying the present improvement. Fig. 2 is a sectional elevation taken from the rear, of the instrument illustrated in Fig. 1. Fig. 3 is a vertical section taken in a central plane from front to rear.

Like letters of reference in the several figures indicate the same parts.

The simple form of instrument adopted for illustrating the invention, embodies a casing A, preferably having a cover plate A', Fig. 3, provided with a sight opening $a$, through which the dial B and indicating hand C of the instrument may be seen. Within the casing A there is mounted a front plate D, adapted to carry the working parts of the instrument, and said front plate may, if so desired, constitute the frame for said parts, although in the particular instrument illustrated the frame is preferably formed by a substantially rigid vertical bar E, having cross pieces $e$ at top and bottom. Said cross pieces are adapted to receive or form abutments for a vertically arranged tube F, which tube should have relatively thin walls and a high coefficient of expansion. Where the tube is connected with the cross pieces $e$, it is also preferable that the vertical bar E should be made of a metal having the same coefficient of expansion in order that there may be no distortion of the parts as the temperature increases or decreases.

The tube F is provided with heads $f$, and extending longitudinally within the tube is a member G, usually in the form of a relatively small or flat wire or ribbon, and which expands and contracts very slightly or none at all, as compared with the expansion and contraction of the tube itself when subjected to variations in temperature. This member G, for convenience, will be termed the arc member, inasmuch as it is adapted to be rigidly but adjustably connected with the heads $f$ of the tube and to be deflected centrally through its connection with the indicating mechanism. The connections between the arc member and the chord member F are preferably adjustable connections, conveniently formed by threading the ends of the arc member and applying nuts $g$ thereto, as will be readily understood. At a suitable point intermediate the ends of the chord member F, an aperture F′ is formed for the passage of a connection H extending transversely to an indicator operating arm I. This arm I carries at its upper end a spring-pressed rack K, adapted to mesh with a pinion L on the indicator hand-shaft C′. The arm I is mounted on the frame E, and while any convenient or well known means for mounting it may be adopted, it is preferred to form a connection with the said frame which will serve not only to support the arm, but also to afford a spring tension for moving the indicator arm in one direction against the tendency of the arc member to straighten when subjected to tension by the expansion of the chord member. As illustrated, the lower end of the arm I is attached to or is formed integral with a flat spring M, and the latter is clamped in a post N secured to the frame E by a screw-nut O, whereby it may be adjusted angularly to vary the tension of the spring.

In adjusting the instrument for use, the deflection of the arc member should be intermediate the two extremes at the average temperature adapted to be indicated by the instrument, and the graduations on the dial and the movement of the indicator hand should be properly proportioned to indicate the extreme temperatures before the arc member reaches either the exact axial line on the one hand, or on the other hand touches the wall of the tube. The intermediate graduations on the dial are made either by comparison with a standard thermometer or by subdividing the interval in the well understood manner.

With an instrument of this construction, it is found that when the size of the parts has once been established for an instrument adapted to indicate variations within certain limits, it is entirely practicable to standardize the parts for duplication, and the instrument will, when the parts are assembled, give practically uniform and accurate readings of all temperatures within its capacity.

In designating the member having the least coefficient of expansion as the arc member, I do not wish to be understood as meaning a member which is necessarily of an arc shape or normally deflected intermediate its ends, as the name is intended as a broad designation of any member which is put under increased tension by the member having the higher coefficient of expansion. In the instruments designed for practical use the arc member is preferably of high grade spring tempered steel always under more or less tension and, if not deflected by the opposing spring, it is straight at all temperatures, the rigidity increasing owing to increased tension at higher temperatures.

Having thus described the invention, what I claim is:

1. In a temperature indicating instrument, the combination with a substantially straight and rigid chord member having a high coefficient of expansion, of a deflectable arc member, having a low coefficient of expansion, attached rigidly at its ends to the ends of the chord member, and an indicator connected centrally with the arc member and embodying means for deflecting said arc member in opposition to the tension of the chord member.

2. In a temperature indicating instrument, the combination with a substantially straight, rigid chord member having a high coefficient of expansion, of a deflectable arc member, having a low coefficient of expansion, with its ends connected rigidly with the chord member, means for deflecting the arc member in opposition to the tension of the chord member, and an indicator controlled by the deflection of the arc member with relation to the axis of the chord member.

3. In a temperature indicating instrument, the combination with the substantially straight rigid chord member, of the arc member connected therewith at its opposite ends, means for deflecting the arc member intermediate its ends and in opposition to the tension exerted by the chord member, an indicator controlled by the deflection of the arc member, and movement multiplying mechanism for increasing the range of movement of the indicator.

4. In a temperature indicating instrument, the combination with the substantially straight rigid chord member having a high coefficient of expansion, of the arc member, having a relatively low coefficient of expansion, attached thereto at its opposite ends, means for deflecting the arc member intermediate its ends in opposition to the tension of the chord member, a spring for deflecting the arc member intermediate its ends, and an indicator controlled by such deflection, substantially as described.

5. In a temperature indicating instrument, the combination with the straight, tubular rigid chord member having a relatively high coefficient of expansion, of an arc member inclosed within said chord member and attached thereto at its opposite ends, means for deflecting the arc member intermediate its ends, and an indicator controlled by such deflection.

6. In a temperature indicating instrument, the combination with the straight tubular chord member having a relatively high coefficient of expansion and provided with a transverse aperture intermediate its ends, of an arc member confined within and rigidly connected at its opposite ends with the chord member, an indicator, and means for operating said indicator extending through the aperture in the chord member and connected with the arc member intermediate its ends.

7. In a temperature indicating instrument, the combination with the frame, the indicator mounted thereon and the tubular chord member supported by said frame, of an arc member mounted within the chord member and connected therewith at its opposite ends, and a connection with the arc member extending through the chord member for operating the indicator, substantially as described.

8. In a temperature indicating instrument, the combination with the vertical frame and chord member supported thereby and in parallelism therewith, said frame and chord member having substantially the same coefficient of expansion, of an arc member rigidly connected at its ends with the chord member, an indicator and mechanism for operating the indicator by the deflection of the chord member, mounted on the frame, substantially as described.

ALBERT N. OZIAS.

Witnesses:
FRANK R. HUBACHEN,
VICTOR J. WELCH.